(12) United States Patent
Baba et al.

(10) Patent No.: US 9,049,012 B2
(45) Date of Patent: Jun. 2, 2015

(54) SECURED CRYPTOGRAPHIC COMMUNICATION SYSTEM

(71) Applicant: Kabushiki Kaisha Toshiba, Tokyo (JP)

(72) Inventors: Shinichi Baba, Bristol (GB); Yoshimichi Tanizawa, Kanagawa (JP); Hideaki Sato, Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 101 days.

(21) Appl. No.: 13/788,078

(22) Filed: Mar. 7, 2013

(65) Prior Publication Data

US 2014/0044260 A1 Feb. 13, 2014

(30) Foreign Application Priority Data

Aug. 8, 2012 (JP) ................. 2012-176209

(51) Int. Cl.
*H04L 9/00* (2006.01)
*H04L 9/08* (2006.01)
(52) U.S. Cl.
CPC .............. *H04L 9/0861* (2013.01); *H04L 9/083* (2013.01); *H04L 9/0827* (2013.01)
(58) Field of Classification Search
CPC .................................................... H04L 9/0861
See application file for complete search history.

(56) References Cited

U.S. PATENT DOCUMENTS

| 2006/0095758 | A1* | 5/2006 | Kim et al. ............... 713/151 |
| 2009/0138700 | A1* | 5/2009 | Miyazaki et al. ........... 713/150 |

FOREIGN PATENT DOCUMENTS

| JP | 11-243388 | 9/1999 |
| JP | 2001-007797 | 1/2001 |
| JP | 2004-274480 | 9/2004 |
| JP | 2007-208758 | 8/2007 |
| JP | 2008-154019 | 7/2008 |

OTHER PUBLICATIONS

U.S. Appl. No. 13/596,279, filed Aug. 28, 2012, Shinichi Baba et al.
O. Maurhart. "Chapter 8, QKD Networks Based on Q3P", Applied Quantum Cryptography, Lect. Notes Phys 797, 2010, pp. 151-171.
Mehrdad Dianati et al. "Architecture and protocols of the future European quantum key distribution network", Security and Communication Networks 2008, pp. 57-74.
Japanese Office Action issued Jul. 29, 2014, in Japan Patent Application No. 2012-176209 (with English translation).

* cited by examiner

*Primary Examiner* — Brandon Hoffman
*Assistant Examiner* — Helai Salehi
(74) *Attorney, Agent, or Firm* — Oblon, McClelland, Maier & Neustadt, L.L.P.

(57) ABSTRACT

According to an embodiment, a communication apparatus includes a finding unit; a negotiating unit; and a communicating unit. The finding unit is configured to, in response to a request from an application that makes use of key information, find out a key generating device that generates the key information. The negotiating unit is configured to perform a negotiation operation with respect to the key generating device to determine conditions for key information that is to be generated. The communicating unit is configured to receive, from the key generating device, the key information that is generated based on the conditions determined in the negotiation operation, and send the received key information to the application.

7 Claims, 5 Drawing Sheets

SECURED CRYPTOGRAPHIC COMMUNICATION SYSTEM

CROSS-REFERENCE TO RELATED APPLICATION

This application is based upon and claims the benefit of priority from Japanese Patent Application No. 2012-176209, filed on Aug. 8, 2012; the entire contents of which are incorporated herein by reference.

FIELD

An embodiment described herein relates generally to a communication apparatus, a communication method, a COMPUTER-READABLE MEDIUM, and a communication system.

BACKGROUND

Regarding quantum cryptographic communication, a research project called SECOQC (which stands for Secure Communication based on Quantum Cryptography) is known. In SECOQC, a function is proposed for performing key exchange on the basis of random numbers that are generated by means of quantum key distribution (QKD) and that are dispersedly stored in a plurality of nodes, as well as a technology is proposed for a protocol named Q3P (which stands for Quantum Point to Point).

The QKD technique is one of the techniques for achieving sophistication in the next-generation communication security, and the security of the QKD service itself is an important factor. Thus, for example, QKD is a breakthrough technology that can provide an absolutely secure communication environment.

However, the new type of communication technology such as QKD has a different technological principle than the communication networks or the communication services that already exist and are in use. Hence, it becomes necessary to design a new system compatible to the new communication technology, and it is not easy to apply that new system to the existing communication networks or the existing communication systems. In this way, if a new system that is designed for secure communication is to be applied to an existing communication network, then the differences in the technological principles and the configurations requires making alterations in existing terminals.

DETAILED DESCRIPTION

According to an embodiment, a communication apparatus includes a finding unit; a negotiating unit; and a communicating unit. The finding unit is configured to, in response to a request from an application that makes use of key information, find out a key generating device that generates the key information. The negotiating unit is configured to perform a negotiation operation with respect to the key generating device to determine conditions for key information that is to be generated. The communicating unit is configured to receive, from the key generating device, the key information that is generated based on the conditions determined in the negotiation operation, and send the received key information to the application.

An exemplary embodiment of a communication apparatus will be described in detail below with reference to the accompanying drawings.

Figure 1:
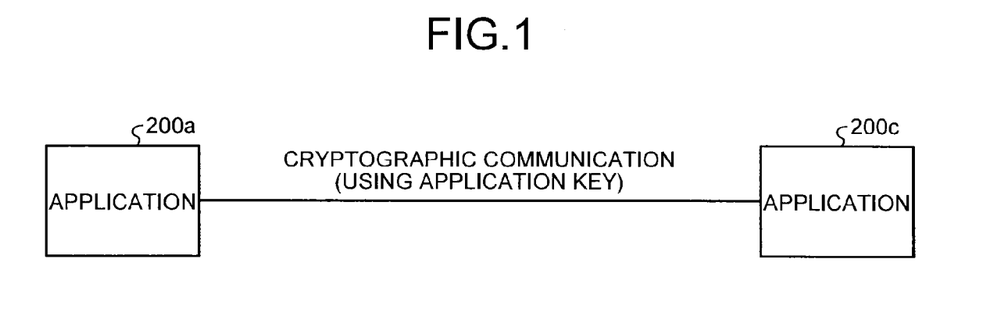
FIG. 1 is a diagram illustrating an exemplary network configuration of a cryptographic communication system.

FIG. 1 is a diagram illustrating an exemplary network configuration of a cryptographic communication system. In terms of the importance of information and communication; cryptographic communication is performed between a plurality of applications (applications 200a and 200c) by means of encryption (using application keys) so as to ensure security in communication.

With the advancement of technology and computers; evolution is occurring in the encryption methods implemented in cryptographic communication and the methods for generating keys that are used in encryption. In that regard, it is often the case that, in many of the current systems, the applications are updated in entirety.

Figure 2:
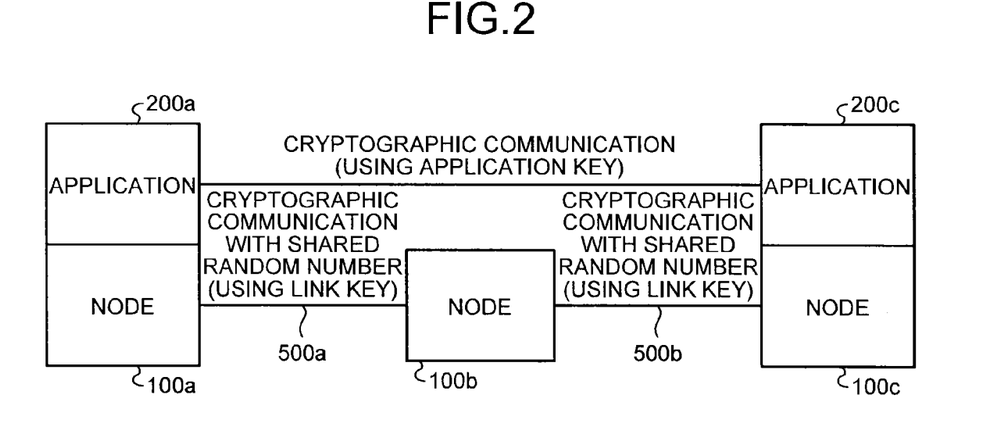
FIG. 2 is a diagram illustrating an exemplary network configuration of a cryptographic communication system.

Moreover, as far as performing cryptographic communication is concerned, a study is underway regarding a system for providing advanced cryptographic communication. In that, a service system, which particularly provides encryption keys (key information), is configured independent of cryptographic communication of data. FIG. 2 is a diagram illustrating an exemplary network configuration of such a cryptographic communication system.

The cryptographic communication system illustrated in FIG. 2 includes nodes 100a to 100c and includes the applications 200a and 200c. Each of the nodes 100a to 100c has the function of generating and sharing a random number with opposite nodes, as well as has the function of performing cryptographic communication over a link by using a random number as an encryption key. The node 100a and the node 100b are connected to each other by a link 500a that represents a cryptographic communication network; while the node 100b and the node 100c are connected to each other by a link 500b that represents a cryptographic communication network.

However, in the cryptographic communication system illustrated in FIG. 2 too, the encryption keys provided by an encryption key generating service are dependent on the encryption method implemented by the applications. For that reason, in order to achieve evolution into a new cryptographic system, eventually the updating needs to be done including the applications. Also, without making changes in the existing cryptographic communication; it is difficult to allow the use of encryption keys, which are provided by an encryption key generating service, in the existing cryptographic communication. Thus, advanced methods of using the encryption keys have not come into popular use, thereby making it difficult to apply the development in the cryptographic technology to a system. The same is true of the case of using cryptographic communication for node authentication or user authentication.

In that regard, in the embodiment, a method is provided that makes it possible to apply an encryption key generating service to an existing system and that makes it possible to use updated encryption keys in the cryptographic communication performed by applications. With that, the development in the cryptographic communication technology can be promptly applied to the cryptographic communication and to the existing applications that perform cryptographic communication. As a result, it is possible to achieve definite enhancement in the security of communication.

Figure 3:
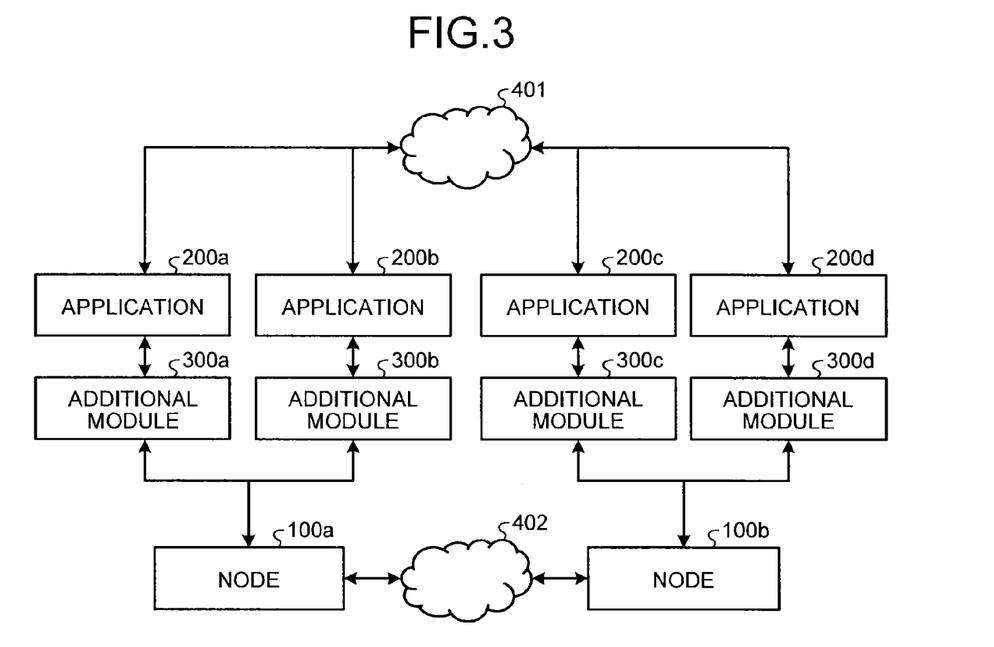
FIG. 3 is a diagram illustrating another exemplary network configuration of a cryptographic communication system according to an embodiment.

FIG. 3 is a diagram illustrating an exemplary network configuration of a communication system according to the embodiment. As illustrated in FIG. 3, the communication system according to the embodiment includes nodes 100a and 100b that function as key generating devices; applications 200a to 200d; and additional modules 300a to 300d.

The applications 200a to 200d are interconnected via a network 401, which corresponds to cryptographic communication links that make use of the application key illustrated in FIGS. 1 and 2. The nodes 100a and 100b are connected to a network 402 that constitutes an encryption key generating service. The network 402 corresponds to the links 500a and 500b illustrated in FIG. 2.

When there is no need to distinguish between the nodes 100a and 100b, they are sometimes simply referred to as nodes 100. Similarly, when there is no need to distinguish between the applications 200a to 200d, they are sometimes simply referred to as applications 200. Moreover, when there is no need to distinguish between the additional modules 300a to 300d, they are sometimes simply referred to as additional modules 300.

The number of nodes 100 is not limited to two; and the number of applications 200 as well the number of additional modules 300 is not limited to four. As described later, the configuration can be such that the application 200 and the additional module 300 are disposed in an integrated manner in the same communication apparatus. Alternatively, the configuration can be such that the application 200 and the additional module 300 are disposed independent of each other in the same communication apparatus. Still alternatively, the configuration can be such that the additional module 300 can be disposed in a device (communication apparatus) that is physically different from the device in which the application 200 is disposed. Moreover, the device (communication apparatus) in which the application 200 and the additional module 300 are disposed can either be installed in an integrated manner with the node 100 or be installed as a terminal independent of the node 100. In the following explanation, the communication apparatus that includes the application 200 is sometimes simply referred to as the application 200.

In the embodiment, as illustrated in FIG. 3, modules (the additional modules 300) are provided to be added to the existing applications 200 that perform cryptographic communication. Each additional module 300 has the functions of finding out an encryption key generating service, performing secure communication with the encryption key generating service, and negotiating with the encryption key generating service about keys.

With such a configuration, with no or minimal modifications thereto, the existing application 200 becomes able to receive the encryption key generating service via the additional module 300. For example, if the additional module 300 as well as the encryption key generating service has the functions mentioned above; then, even in a service such as the existing application 200 that performs cryptographic communication, it becomes easier to adopt updated and powerful encryption keys provided by an advanced encryption key generating service or to adopt an updated and powerful cryptographic communication method.

Figure 4:
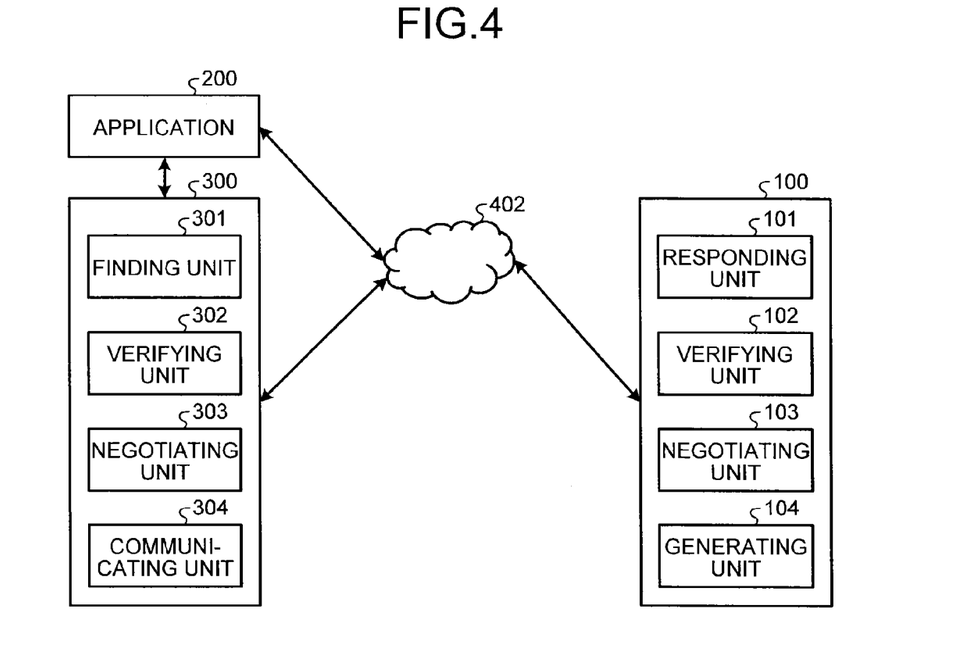
FIG. 4 is a block diagram of an additional module and a node according to the embodiment.

FIG. 4 is a block diagram illustrating an exemplary configuration of the additional module 300 and the node 100 according to the embodiment. As illustrated in FIG. 4, the additional module 300 includes a finding unit 301, a verifying unit 302, a negotiating unit 303, and a communicating unit 304. The node 100 includes a responding unit 101, a verifying unit 102, a negotiating unit 103, and a generating unit 104.

The finding unit 301 finds out, in response to a request from the application 200 which uses encryption keys, the node 100 that generates key information (encryption keys).

For example, prior to performing cryptographic communication, the application 200 starts a key exchange protocol for the purpose of generating an encryption key that is to be used during the cryptographic communication. In such a case in which the application 200 makes use of a specific key exchange protocol at the time of starting cryptographic communication, the additional module 300 detects the activation of the key exchange protocol (i.e., detects a request for generating an encryption key) and starts using the encryption key generating service.

When the activation of the key exchange protocol is detected, the finding unit 301 of the additional module 300 firstly searches for the encryption key generating service. For example, the finding unit 301 establishes connection with a network that uses the dynamic host configuration protocol (DHCP), and searches for a server (the node 100) that provides the encryption key generating service using the DHCP. More particularly, at the time of obtaining an IP address, which is used in the network, via the DHCP; the finding unit 301 obtains server information of the encryption key generating service as part of the information of a service server provided in the network. With that, the finding unit 301 can find out the server (the node 100) that generates the encryption key generating service.

The method of finding out the encryption key generating service (the node 100) implemented by the finding unit 301 is not limited to the method mentioned above. Alternatively, for example, the finding unit 301 sends broadcast packets for the purpose of searching for the encryption key generating service, and the encryption key generating service (the node 100) responds to the broadcast packets. With that, the encryption key generating service is found. In this type of configuration, for example, the responding unit 101 of the node 100 is used. For example, when the broadcast packets sent by the finding unit 301 are received, the responding unit 101 sends a response to the additional module 300 indicating that the corresponding node 100 provides the encryption key generating service.

The additional module 300 obtains an encryption key by making use of the encryption key generating service that has been found. At that time, the additional module 300 needs to perform secure communication with the encryption key generating service and obtain a reliable encryption key.

In that regard, the verifying unit 302 verifies the validity of the encryption key generating service that has been found. Then, with the node 100 that the verification is successful, the verifying unit 302 establishes secure communication. For example, in the case of using the encryption key generating service on the global Internet, the additional module 300 and the encryption key generating service (the node 100) are registered in advance with a reliable certificate authority. Then, the verifying unit 302 uses a public key and performs two-way authentication with the encryption key generating service (i.e., with the verifying unit 102 of the node 100). Similarly, the verifying unit 102 also performs two-way authentication with the verifying unit 302.

Thus, the verifying unit 302 confirms the validity of the encryption key generating service using two-way authentication; as well as performs, if necessary, encryption key settings for the purpose of keeping further communication with the encryption key generating service confidential. In the case of using a commonplace service such as the cloud service, it is desirable to take such a measure.

In contrast, in the case when the encryption key generating service is provided on the premise of a closed and limited environment, it is possible to implement a simpler method. For example, by confirming that direct communication is possible at the Ethernet (registered trademark) level, the verifying unit 302 can determine that the encryption key generating service (the node 100) is present in a reliable physical network to which the application 200 is connected. In the case when the application 200 and the encryption key generating service (the node 100) are installed at a physically secure location equipped with an intrusion prevention mechanism, it is possible to implement a verification method that makes use of the intrusion prevention mechanism. For example, the verifying unit 302 verifies the validity of the node 100 by confirming whether or not the intrusion prevention mechanism is properly functioning. For example, after the previous cryptographic communication session is over, if it can be confirmed that nobody has intruded into the location having the intrusion prevention mechanism or that no person without authority has entered the room, the verifying unit 302 determines that the encryption key generating service (the node 100) is reliable.

Moreover, concurrently with the authentication operation, the verifying unit 302 can also perform the operation of confirming the presence or absence of the security function supported by the encryption key generating service (the node 100), which is the other side of communication, or the security function supported by the application 200. For example, the verifying unit 302 notifies the application 200 as well as the node 100 about what type of encryption protocol can be used for the traffic between the application 200 and the encryption key generating service (the node 100). In case no encryption protocol is available that can ensure the requested security, the verifying unit 302 can consider it as authentication failure.

Meanwhile, the security function to be confirmed is not limited to the function mentioned above. For example, it is also possible to confirm the presence or absence of the security function (the data encryption function) supported by the operating system (OS) of the encryption key generating service, which is the other side of communication, or the OS of the application. In case the other side of communication is such that the encryption technique (data encryption function) that can ensure the requested security is not available, the verifying unit 302 can consider it as authentication failure.

Such a confirmation operation of confirming the presence of absence of the security function at the other side of communication need not be performed only concurrently with the authentication operation. For example, the confirmation operation can be performed concurrently with, for example, the operation performed by the finding unit 301 for finding out the service.

In this way, once the confirmation of a reliable encryption key generating service (the node 100) as well as the confirmation of a reliable communication method with the encryption key generating service is complete, the additional module 300 obtains an encryption key from the encryption key generating service. To enable that, the negotiating unit 303 performs a negotiation operation with respect to the node 100 to determine encryption key conditions that are to be generated. Similarly, the negotiating unit 103 of the node 100 performs the negotiation operation with respect to the negotiating unit 303 of the additional module 300.

In the negotiation operation, the negotiating unit 303 notifies the encryption key generating service (notifies the negotiating unit 103 of the node 100) about the necessary encryption key conditions. Then, the generating unit 104 of the node 100 generates an encryption key that satisfies the encryption key conditions determined in the negotiation operation, and provides that encryption key to the additional module 300.

The encryption key conditions are the conditions that affect the generation of encryption keys. For example, as the encryption key conditions, it is possible to use the length of a random number that is used as an encryption key (as an example, throughput (such as 1 Mbps) indicating the bit length of the random number usable per unit time); the address (IP address) of the other side of cryptographic communication; and the encryption method.

The encryption method can be specified using the supported encryption and/or the authentication algorithm and using the information about the key length of the encryption key used by that algorithm. For example, the encryption method can be notified as "AES-128-CBC", "AES-256-CBC", or "DES-EDE3". In the case of an encryption method in which the encryption keys are periodically exchanged, the updating frequency of encryption keys (for example, updating interval=60 minutes) can also be specified as one of the encryption key conditions.

Meanwhile, the method of describing the encryption key conditions is determined in advance. Furthermore, the manner of mutually exchanging the encryption key conditions is also determined in advance. For example, when the encryption key conditions are provided from the additional module 300, a response is given about whether or not the encryption key generating service (the node 100) is available. If the encryption key generating service (the node 100) is not available, the negotiating unit 303 can implement the method of resending a query to the encryption key generating service (the node 100). In that case, it becomes possible to simplify the protocol design or the function design. However, in this method, there is a possibility that the additional module 300 takes time to find out the encryption key conditions that can be generated in the encryption key generating service.

In that regard, instead of sending back the notification about the service not being available, the encryption key generating service (the node 100) can be configured to send back the encryption key conditions that the node 100 can generate. In that case, although the encryption key generating service (the node 100) needs to have a function of expanding the encryption key conditions, it becomes increasingly likely that a conclusion about encryption key negotiation is reached in a short amount of time.

Meanwhile, at the time of starting the negotiation operation, the encryption key generating service (the node 100) can be configured to present the maximal encryption key condition that can be generated to the additional module 300. With that, the additional module 300 becomes able to propose easy and appropriate encryption key conditions to the application 200 for receiving the encryption key generating service. In this case, although there may arise a need to equip the additional module 300 with the function of performing advanced condition adjustment such as setting the encryption key conditions, from among the proposed encryption key conditions, according to the specification of the application 200; it becomes increasingly likely that a conclusion about encryption key negotiation is reached in a short amount of time. In this way, by providing a function or a protocol for negotiating the encryption key conditions, it becomes possible for the additional module 300 and the encryption key generating service (the node 100) to negotiate about the required encryption key.

The communicating unit 304 establishes connection with a key generating device that the verification is successful. Moreover, the communicating unit 304 performs communication with external devices such as the application 200 and the other node 100. For example, from the node 100, the communicating unit 304 receives the encryption key that is generated by the generating unit 104 based on the encryption key conditions which are determined according to the negotiation operation; and sends the application key to the application 200.

Meanwhile, the constituent elements of the additional module 300 as well as the node 100 can be implemented by running computer programs in a processing unit such as a central processing unit (CPU), that is, can be implemented using software; or can be implemented using hardware such as an integrated circuit (IC); or can be implemented using a combination of software and hardware.

By providing such functions, even in the existing application 200 or an existing service that performs cryptographic communication, it becomes easier to adopt updated and powerful encryption keys provided by an advanced encryption key generating service or to adopt an updated and powerful cryptographic communication method.

Figure 5:
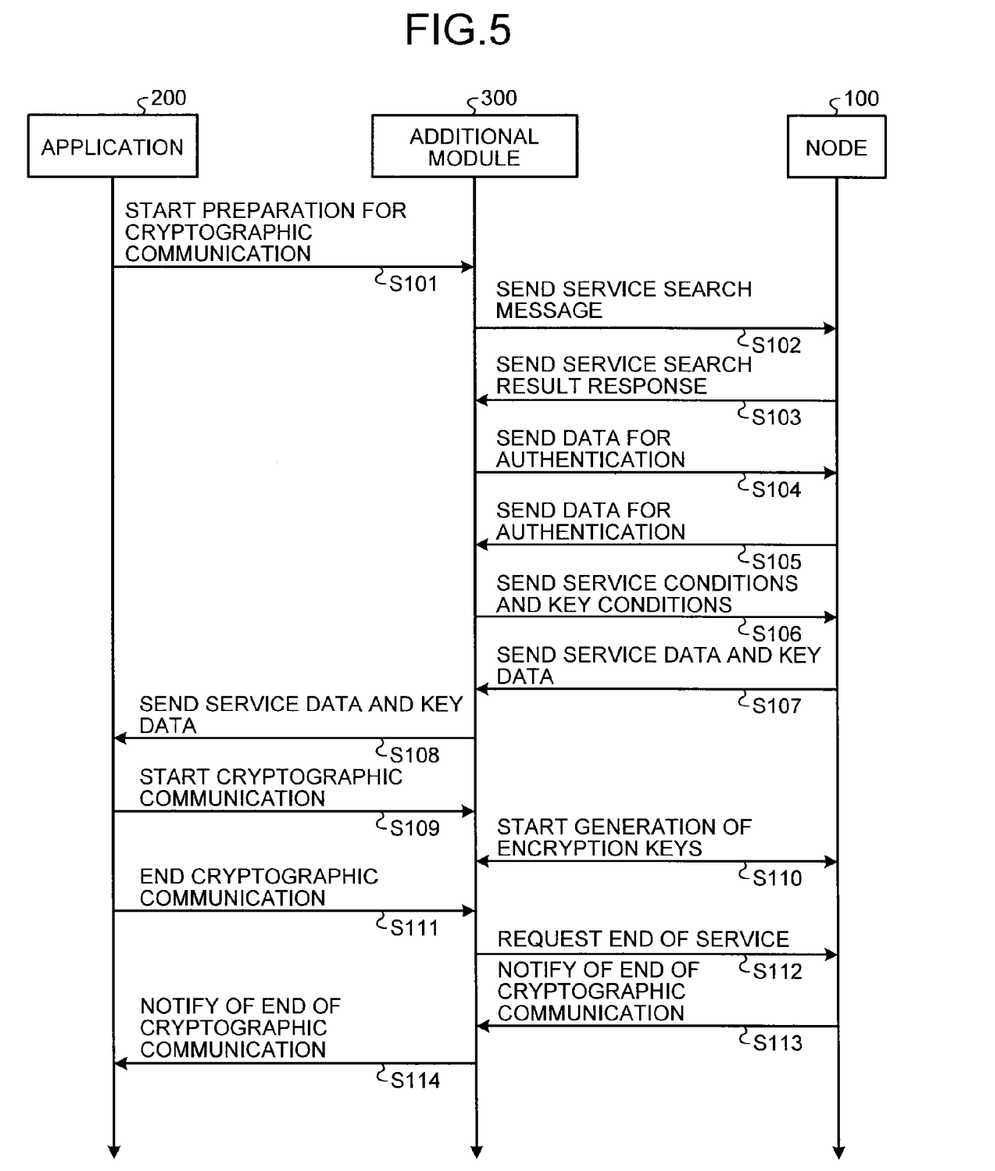
FIG. 5 is a sequence diagram illustrating an example of the communication operation according to the embodiment.

Explained below with reference to FIG. 5 is a communication operation performed in the communication system that is configured in the manner described above according to the embodiment. FIG. 5 is a sequence diagram illustrating an example of the communication operation according to the embodiment.

The application 200 starts the preparation for performing cryptographic communication (Step S101). For example, the application 200 starts the key exchange protocol that is to be used in cryptographic communication.

The finding unit 301 of the additional module 300 detects the start of the preparation for performing cryptographic communication and sends a service search message (Step S102). Herein, the service search message is, for example, is a broadcast packet as mentioned above. In FIG. 5, it is illustrated that the service search message is sent to the node 100. However, in practice, the broadcast packets are sent also to other devices.

The responding unit 101 of the node 100 receives the service search message and sends a response (i.e., sends a service search result response) (Step S103).

If no response is received; then, for example, the finding unit 301 notifies the application 200 of the fact that no response is received. When the response is received, the verifying unit 302 of the additional module 300 performs two-way authentication with the verifying unit 102 of the node 100. That is, the verifying unit 302 sends data for two-way authentication to the node 100 that has been found (Step S104). Then, the verifying unit 102 of the node 100 sends data for two-way authentication to the additional module 300 that is the data source (Step S105).

If the two-way authentication fails in verifying the validity of the node 100; then, for example, the verifying unit 302 notifies the application 200 about the fact that authentication has failed. When the validity is verified, the negotiating unit 303 of the additional module 300 performs the negotiation operation with respect to the negotiating unit 103 of the node 100. For example, the negotiating unit 303 sends service conditions and key conditions to the negotiating unit 103 of the node 100 (Step S106). The service conditions point to the conditions, other than the encryption key conditions, that are required while using a key generating service. For example, the service conditions include the other side of communication, the network to be used, and the communication speed.

The negotiating unit 103 of the node 100 receives the service conditions and the key conditions, and sends service data that satisfies the service conditions and sends key data that satisfies the key conditions to the additional module 300 (Step S107). The service data points to, for example, the data indicating specific settings for satisfying the service conditions. For example, the service data includes the address of the other side of communication, the data representing the network to be used, and the value of communication speed. The key data points to, for example, the data that contains the encryption key which is generated according to the encryption key conditions that have been determined.

The communicating unit 304 of the additional module 300 sends the service data and the key data to the application 200 (Step S108). With that, the application 200 becomes able to make use of the encryption key that satisfies the key conditions, and start the cryptographic communication that satisfies the service conditions. That is, the application 200 starts the cryptographic communication using the received encryption key (Step S109). Moreover, the additional module 300 starts generating the encryption keys, which are to be used in cryptographic communication, with the node 100 (Step S110).

At the time of ending the cryptographic communication, the application 200 notifies the additional module 300 about ending the cryptographic communication (Step S111). Then, the additional module 300 issues a request to the node 100 for ending the encryption key generating service (Step S112). Upon receiving the request to end the encryption key generating service, the node 100 stops providing the encryption key generating service to the additional module 300 and notifies the additional module 300 about the same (Step S113). Then, the additional module 300 notifies the application 200 about the end in the encryption key generating service (Step S114). That marks the end of the communication operation.

The additional module 300 is provided, for example, by the encryption key generating service side. With that, it becomes possible to effectively implement the various functions described above.

The additional module 300 can be provided in various forms. For example, the configuration can be such that the functions of the additional module 300 are included in a device that is independent of the device in which the application 200 runs. For example, the configuration can be such that a device including the functions of the additional module 300 is inserted in the middle of a cable that connects the device in which the application 200 runs to a communication network.

In this case, with little or no change and effect in the device in which the application 200 runs, a wider application range can be achieved for using the encryption key generating service. However, on the other hand, it becomes necessary to develop an independent device on the side of providing the encryption key generating service, and it becomes necessary for the user to purchase that device. Hence, such a configuration may find it difficult to become popular.

Figure 6:
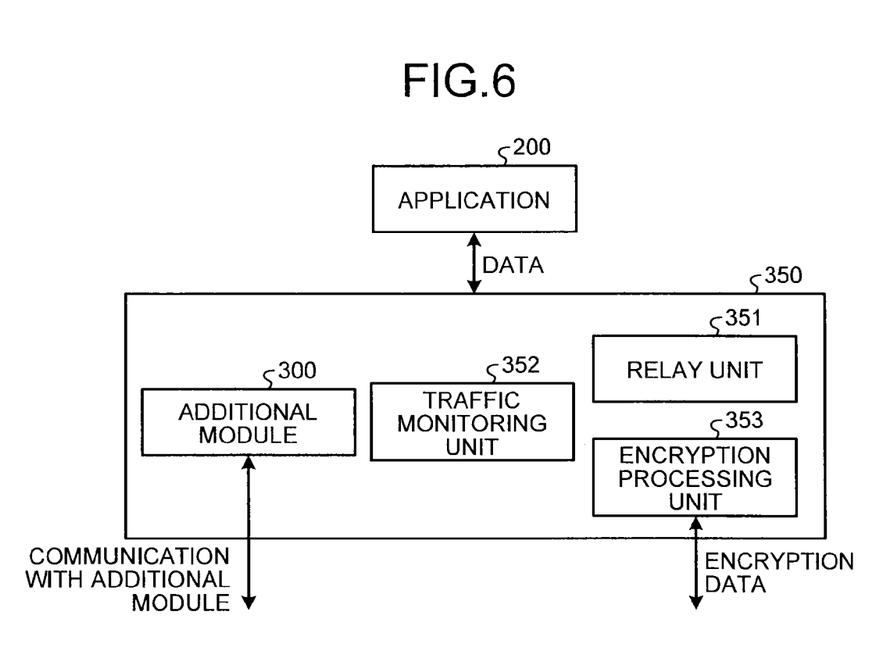
FIG. 6 is a diagram illustrating a configuration example of a case in which the additional module is included in a device that is independent of an application.

FIG. 6 is a diagram illustrating a configuration example of a case in which the additional module 300 is included in a device that is independent of the application 200. In FIG. 6 is illustrated an example in which the additional module 300 is included in a relay device 350 that is equipped with a data relay function. As illustrated in FIG. 6, the relay device 350 includes the additional module 300, a relay unit 351, a traffic monitoring unit 352, and an encryption processing unit 353.

The relay unit 351 relays data that is communicated between the application 200 and the node 100. The traffic monitoring unit 352 monitors the traffic of the data being relayed and determines the necessary timing for starting the encryption key generating service. For example, in the case when the data being relayed represents the start of operations of the key exchange protocol, the traffic monitoring unit 352 determines that it is necessary to start the encryption key generating service. Then, the traffic monitoring unit 352 issues a request to the finding unit 301 of the additional module 300 for finding out the encryption key generating service.

The encryption processing unit 353 performs encryption and decryption of the data being relayed.

Meanwhile, instead of having the additional module 300 as a device independent of the application 200, the additional module 300 can be designed and developed as a driver for managing a connection module of the communication network and as a module software (library) running on an OS. However, in that case, the environment of the device in which the application 200 is running affects the design of the additional module 300. On the other hand, the method of implementation or the reduction in cost becomes easier.

If it becomes possible to provide the additional module 300 as a library, the development and the popularization of the additional module 300 becomes easier. In this case too, the environment of the device in which the application 200 is running affects the additional module 300; and each application 200 needs to be altered so as to be able to use the library. However, if the application 200 substitutes for the existing function of performing key exchange and is made alterable by means of modifying an application programming interface (API) with the aim of using the library, then the alteration can be performed more easily.

Figure 7:
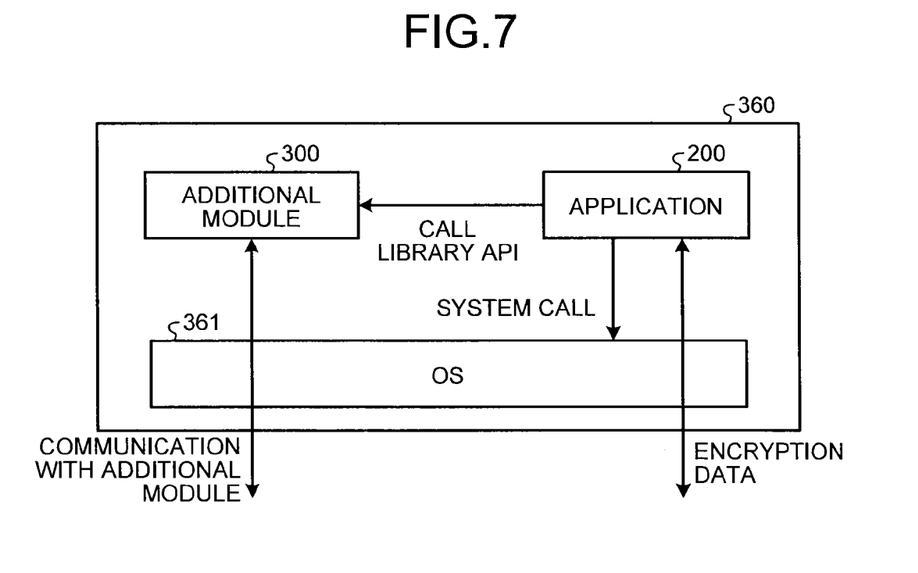
FIG. 7 is a diagram illustrating a configuration example of a case in which the additional module is configured as a library.

FIG. 7 is a diagram illustrating a configuration example of a case in which the additional module 300 is configured as a library. In FIG. 7 is illustrated a configuration example of a communication apparatus 360 that is the device in which the application 200 runs. The communication apparatus 360 includes the application 200, the additional module 300 that functions as a library, and an OS 361.

When the additional module 300 is configured as a library, the application 200 needs to perform library calling (library API calling) for calling the library of the additional module 300. For that, it becomes necessary to alter the application 200.

Figure 8:
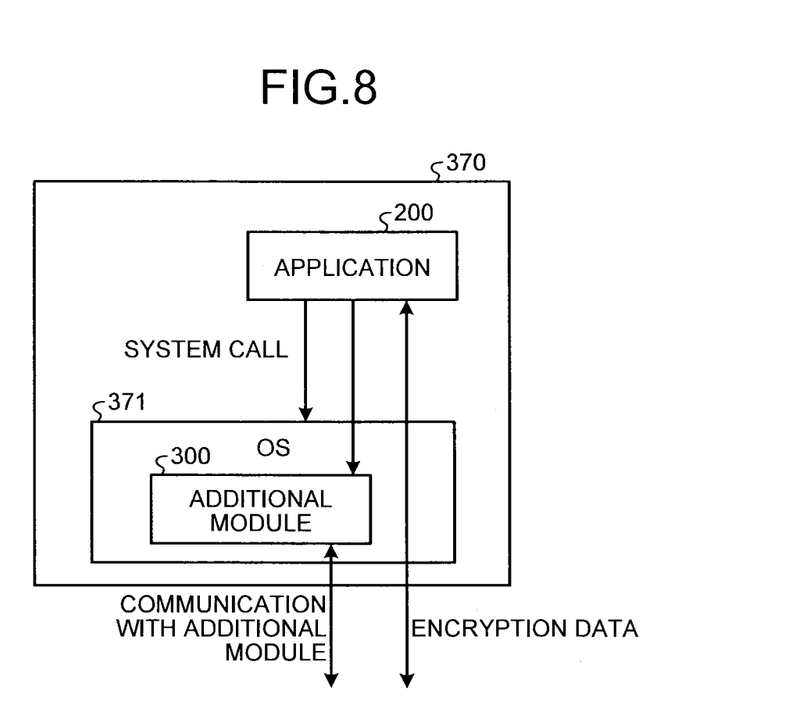
FIG. 8 is a diagram illustrating a configuration example of a case in which the additional module is configured as a driver.

FIG. 8 is a diagram illustrating a configuration example of a case in which the additional module 300 is configured as a driver. In FIG. 8 is illustrated a configuration example of a communication apparatus 370 that is the device in which the application 200 runs. The communication apparatus 370 includes the application 200, the additional module 300 that functions as a driver, and an OS 371. In the configuration example illustrated in FIG. 8, the OS 371 includes the additional module 300 functioning as a driver.

Even in the case when the additional module 300 is configured as a driver, the application 200 may need to perform a system call for calling the driver (the additional module 300). However, for example, there is also a possibility that, based on the system call information for the application 200, the necessary encryption key generating service can be executed in the additional module 300 (without the application 200 having to explicitly perform a system call). Hence, in the case when the additional module 300 is configured as a driver, a smaller amount of alternations in the application 200 may serve the purpose as compared to the case when the additional module 300 is configured as a library.

In this way, in the communication apparatus according to the embodiment, a new encryption key generating service can be used in an existing application that performs cryptographic communication. Moreover, the cryptographic communication performed by an existing application can be improved in terms of security without difficulty.

Figure 9:
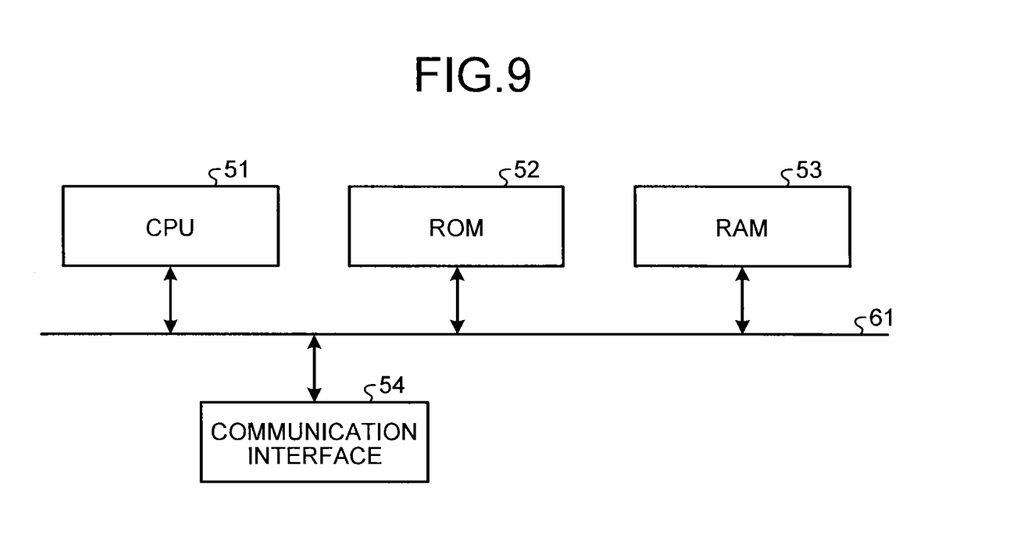
FIG. 9 is an explanatory diagram for explaining a hardware configuration of the communication apparatus according to the embodiment.

Explained below with reference to FIG. 9 is a hardware configuration of the communication apparatus according to the embodiment. FIG. 9 is an explanatory diagram for explaining a hardware configuration of the communication apparatus according to the embodiment.

The communication apparatus according to the embodiment includes a control device such as a CPU 51; memory devices such as a read only memory (ROM) 52 and a random access memory (RAM) 53; a communication I/F 54 that performs communication by establishing a connection with a network; and a bus 61 that interconnects the other constituent elements.

The computer programs (for example, the additional module configured as a driver or a library) that are executed in the communication apparatus according to the embodiment are stored in advance in the ROM 52.

Alternatively, the computer programs that are executed in the communication apparatus according to the embodiment can be recorded in the form of installable or executable files in a computer-readable recording medium such as a compact disk read only memory (CD-ROM), a flexible disk (FD), a compact disk readable (CD-R), or a digital versatile disk (DVD).

Still alternatively, the computer programs that are executed in the communication apparatus according to the embodiment can be saved as downloadable files on a computer connected to the Internet or can be made available for distribution through a network such as the Internet.

Meanwhile, the computer programs that are executed in the communication apparatus according to the embodiment contain a module for each of the abovementioned constituent elements to be implemented in a computer. In practice, for example, the CPU 51 reads the computer programs from a computer-readable memory medium and runs them such that the computer programs are loaded in a main memory device. As a result, the module for each of the abovementioned constituent elements is generated in the computer.

While certain embodiments have been described, these embodiments have been presented by way of example only, and are not intended to limit the scope of the inventions. Indeed, the novel embodiment described herein may be embodied in a variety of other forms; furthermore, various omissions, substitutions and changes in the form of the embodiment described herein may be made without departing from the spirit of the inventions. The accompanying claims and their equivalents are intended to cover such forms or modifications as would fall within the scope and spirit of the inventions.

What is claimed is:

1. A communication apparatus comprising:
a finding unit configured to, in response to a request from an application that makes use of key information, find out a key generating device that generates the key information by generating and sharing a random number with another key generating device;
a negotiating unit configured to perform a negotiation operation with respect to the key generating device to determine conditions for key information that is to be generated, the conditions including throughput indicating a bit length of key information usable per unit time by the application among the key information generated by the key generating device; and
a communicating unit configured to
receive, from the key generating device, the key information that is generated based on the conditions determined in the negotiation operation, and
send the received key information to the application;
a verifying unit verifies the presence or absence of a security function applicable to communication between the apparatus and the key generating device, and
if the security function is present, the verifying unit determines that the verification is successful.

2. The apparatus according to claim 1, further comprising the verifying unit configured to verify the validity of the key generating device, wherein the communication unit establishes communication with the key generating device that the verification is successful.

3. The apparatus according to claim 1, wherein in response to a request from the application, the finding unit verifies the presence or absence of a security function applicable to communication between the apparatus and the key generating device to find out the key generating device that has the security function.

4. The apparatus according to claim 1, wherein the communicating unit receives, from the key generating device, available conditions for key information that is to be generated, and sends the received conditions to the application.

5. A communication method comprising:
in response to a request from an application that makes use of key information, finding out a key generating device that generates the key information by generating and sharing a random number with another key generating device;
performing a negotiation operation with respect to the key generating device to determine conditions for key information that is to be generated, the conditions including throughput indicating a bit length of key information usable per unit time by the application among the key information generated by the key generating device;
receiving, from the key generating device, the key information that is generated based on the conditions determined in the negotiation operation; and
sending the received key information to the application;
verifying the presence or absence of a security function applicable to communication between an apparatus and the key generating device, and
if the security function is present, the verifying determines that the verification is successful.

6. A non-transitory computer-readable medium containing a program which when executed by a computer cause the computer to perform a method, comprising:
finding, in response to a request from an application that makes use of key information, out a key generating device that generates the key information by generating and sharing a random number with another key generating device;
performing a negotiation operation with respect to the key generating device to determine conditions for key information that is to be generated, the conditions including throughput indicating a bit length of key information usable per unit time by the application among the key information generated by the key generating device;
receiving, from the key generating device, the key information that is generated based on the conditions determined in the negotiation operation; and
sending the received key information to the application;
verifying the presence or absence of a security function applicable to communication between an apparatus and the key generating device, and if the security function is present, the verifying determines that the verification is successful.

7. A communication system comprising: a communication apparatus; and
a key generating device that generates key information by generating and sharing a random number with another key generating device, wherein
the communication apparatus includes
a finding unit configured to, in response to a request from an application that makes use of key information, find out the key generating device;
a first negotiating unit configured to perform a negotiation operation with respect to the key generating device to determine conditions for key information that is to be generated, the conditions including throughput indicating a bit length of key information usable per unit time by the application among the key information generated by the key generating device; and
a communicating unit configured to
receive, from the key generating device, the key information that is generated based on the conditions determined in the negotiation operation, and
send the received key information to the application, and
the key generating device includes
a second negotiating unit configured to perform the negotiation operation with respect to the communication apparatus; and
a generating unit configured to
generate the key information based on the conditions determined in the negotiation operation, and
send the key information to the communication;
a verifying unit that verifies the presence or absence of a security function applicable to communication between the apparatus and the key generating device, and
if the security function is present, the verifying unit determines that the verification is successful.

* * * * *